United States Patent [19]

Schwanzer

[11] 4,388,546
[45] Jun. 14, 1983

[54] ARRANGEMENT FOR CONTROLLING THE INTERNAL POTENTIAL IN GENERATOR RODS

[75] Inventor: Wilhelm Schwanzer, Muelheim, Fed. Rep. of Germany

[73] Assignee: Kraftwerk Union Aktiengesellschaft, Mulheim, Fed. Rep. of Germany

[21] Appl. No.: 339,690

[22] Filed: Jan. 15, 1982

[30] Foreign Application Priority Data

Jan. 29, 1981 [DE] Fed. Rep. of Germany ....... 3102886

[51] Int. Cl.³ .............................................. H02K 3/40
[52] U.S. Cl. .................................................... 310/196
[58] Field of Search ............ 310/45, 196; 174/73 SC, 174/73 R

[56] References Cited

U.S. PATENT DOCUMENTS 2,939,976  6/1960  Manni ................................. 310/196
3,508,096  4/1970  Kull et al. .......................... 310/196
3,896,406  7/1975  Anderson et al. ............... 310/196 X

FOREIGN PATENT DOCUMENTS 277375  12/1969  Austria .
2755050  12/1977  Fed. Rep. of Germany .

Primary Examiner—Donovan F. Duggan
Attorney, Agent, or Firm—Karl F. Milde, Jr.

[57] ABSTRACT

Arrangement for controlling the internal potential in generator rods by means of a band consisting of semi-conductive web, which is wound helically about the wiring assembly composed of insulated conductor elements. In order to obtain a possibly uniform potential over the entire rod length, the band is reinforced by electrically conductive threads spaced in longitudinal direction, whereby the electrically conductive threads are d-c coupled at a contact point with each other and with a conductor element.

7 Claims, 3 Drawing Figures

ARRANGEMENT FOR CONTROLLING THE INTERNAL POTENTIAL IN GENERATOR RODS

NATURE OF THE INVENTION

The invention relates to an arrangement for controlling the internal potential in generator rods in electric generators.

BACKGROUND OF THE INVENTION

Such an arrangement for controlling the internal potential is disclosed in German patent application DE-OS No. 27 55 050. In the arrangement described therein, a polyester made conductive by carbon black particles is wound around a wiring assembly composed of insulated conductor elements and d-c coupled at a single contact point with one of the conductor elements, this conductor element being free of its insulation in the range of its contact point. A disadvantage of such a structure is that due to the relatively great resistance of the semi-conductive web, a uniform potential over the entire rod length is not possible. Beyond that, the conductivity, which is possibly influenced by the processing technique can not be determined in advance, because the fibrous web can be influenced by surrounding resins. On the other hand, the provision of several contact points between the semi-conductive band and the conductor element, would be too expensive, particularly since the conductor element constantly changes its position in the wiring assembly by the twisting, so that it is difficult to find for the application of the contact points.

In another arrangement disclosed in patent application of Austria AT-PS No. 277 375, the internal potential is controlled by a band of juxtaposed metallic threads, which are woven with each other by a weft of non-conductive material. This band is likewise d-c coupled at a single contact point with one of the conductor elements. Due to the relatively low resistance of the band, the potential is uniform over the entire rod length, but because of the low resistance there are high eddy current losses, which lead to undesired heating. This heat can become so great in the case of a short circuit that the metallic threads of the band melt.

OBJECT OF THE INVENTION

The object of the invention is therefore to provide an arrangement for controlling the internal potential in generator rods which leads to a possible uniform potential over the entire rod length, while avoiding eddy current losses.

SUMMARY OF THE INVENTION

The arrangement according to the invention establishes a connection between the conductivity of a semi-conductive band and electrically conductive threads, where the electrically conductive threads ensure, in addition to a mechanical reinforcement of the band in longitudinal direction, a safe and invariable conductivity. The cross-section and the thickness of the electrically conducted threads can be so selected that no eddy current losses appear from the slot cross field. The cross connection of the electrically conductive threads is effected by the semi-conductive band. The potential is thus uniform over the entire rod length, which permits a satisfactory measurement of the di-electric loss factor and a reliable quality evaluation during the insulation test.

The electrically conductive threads can be made of carbon. In this case the electrical connection at the contact point is preferably made by a conductive cement.

The electrically conductive threads can also be made of a metal. This has the advantage that the d-c coupling at the contact point can be established by a solder.

Between the wiring assembly and the band can be arranged additionally a basic roll of insulating material. The basic roll serves to avoid short circuits between the individual conductors element, when the covering of the conductor elements itself is not sufficiently insulated, or when the conductor elements have e.g. blank areas in the range of the offsets.

The design and operation of an embodiment of the invention will be described more fully on the basis of an embodiment of the invention in a schematic drawing.

THE DRAWINGS

DETAILS OF THE INVENTION

Figure 1:
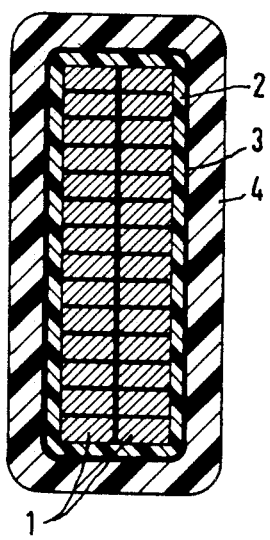
FIG. 1 shows a cross section through a generator rod.

In the generator rod represented in FIG. 1 in a cross section, the conductor elements 1 consisting of insulated flat copper wire and twisted with each other are arranged in two juxtaposed conductor element planes, whereby each conductor element plane comprises 14 superposed conductor elements 1. The insulation of the individual conductor elements consists, e.g., of covers of glass fibers or polyester fibers in combination with binding lacquers or resins. The substantially square wiring assembly formed by the individual insulated conductor elements 1 is surrounded by an insulating basic roll 2, which consists, e.g., of a helically wound mica band. Around the insulating basic roll 2 is then helically wound a band 3 which consists of a semi-conductive web, e.g., a polyester web made conductible by carbon black particles.

Figure 2:
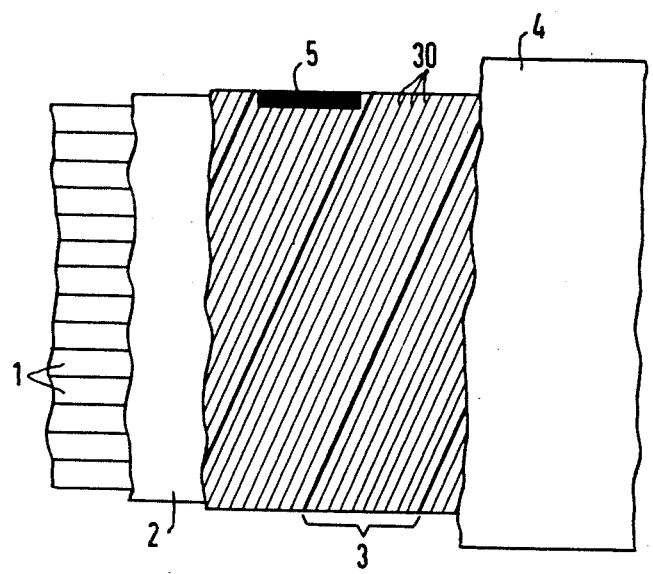
FIG. 2 shows a side elevation of the generator rod represented in FIG. 1 where the layers surrounding the wiring assembly are partly removed.
Figure 3:
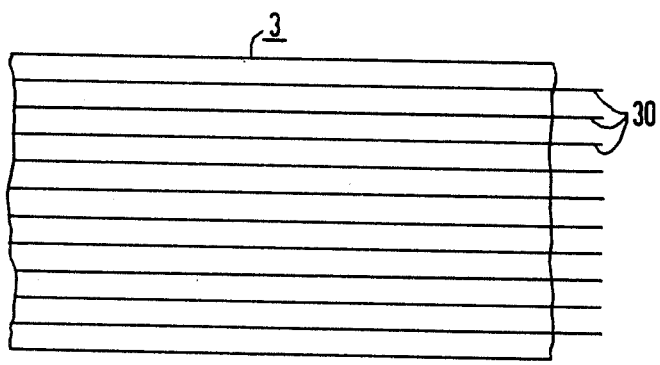
FIG. 3 shows the semi-conductive band inserted in FIGS. 1 and 2 for controlling the internal potential and reinforced by electrically co-inductive threads.

As can be seen particularly in FIGS. 2 and 3, the semi-conductive band 3 is reinforced by several electrically conductive threads 30 arranged spaced from each other, these threads 30 consisting, e.g., of copper or thin copper strands. At a single contact point is provided in basic roll 2 a contact window, and the insulation of the underlying conductor element is removed, so that the various wires can be band 3 forms an inner mica protection, which measures a uniform internal potential control over the entire slot length by the d-c coupling with the electrically conductive threads 30 and one conductor element 1. The semi-conductive band 3 is finally surrounded by a high-voltage insulation 4, on which can be applied an outside conventional mica protection.

FIG. 3 shows the semi-conductible band 3 which consists of a polyester web made conductive by carbon black particles. In the longitudinal direction of this band 3 extend several spaced electrically conductive threads 30 of copper, which project in the drawing from the tearing edge of band 3 shown on the right in the drawing and which can then be better recognized. These threads 30 were woven into the web material pressed-in or otherwise mechanically or electrically connected with the semi-conductive band 3.

As mentioned above, other materials can also be used. Thus, band 3 can consist of another semi-conductive web, for example, of graphite paper or a graphited glass silk fabric. Threads 30 can also consist of other conductible materials, e.g., aluminum or carbon. But care should be taken in the selection of the materials that the electrically conductivity of the threads 30 is at least 100 times better than that of the semi-conductive band 3.

What is claimed is:

1. Arrangement for controlling the internal potential in generator rods by means of a band consisting of semi-conductive material, which is wound helically around the wire assembly composed of insulated conductor elements, and d-c coupled with one of the conductor elements at a contact point, characterized in that the band is reinforced by several electrically conductive threads spaced in the longitudinal direction of the band, and that the electrically conductive threads are d-c coupled at the contact point with each other and with one conductor element.

2. Arrangement according to claim 1, characterized in that the electrically conductive threads consist of carbon.

3. Arrangement according to claim 1, characterized in that the electrically conductive threads consist of metal.

4. Arrangement according to claim 2, characterized in that the d-c coupling at the contact point is established by a conductive cement.

5. Arrangement according to claim 3, characterized in that the d-c coupling is established at the contact point by a solder.

6. Arrangement according to claim 1, characterized in that an additional basic roll of insulating material is arranged between the wiring assembly and the band.

7. Means for controlling the internal potential in the wiring assembly of an electrical generator, said wiring assembly comprising a plurality of interwound insulated conductors, a band of semi-conductive material, said band being helically wound about said wiring assembly and having an electrical connection with one of said conductors, said band being mechanically reinforced by a plurality of spaced electrically conductive threads running longitudinally thereof, said threads being electrically connected to each other and to said one of said conductors at the location of said connection.

* * * * *

UNITED STATES PATENT AND TRADEMARK OFFICE
CERTIFICATE OF CORRECTION

PATENT NO. : 4,388,546
DATED : June 14, 1983
INVENTOR(S) : Wilhelm Schwanzer

It is certified that error appears in the above—identified patent and that said Letters Patent is hereby corrected as shown below:

In column 2, line 54, add:

-- d-c coupled with conductor elements 1 of the semi-conductive band 3 at the contact point, by means of a solder 5. This way the semi-conductive --

Signed and Sealed this

Twenty-third Day of August 1983

[SEAL]

Attest:

GERALD J. MOSSINGHOFF

Attesting Officer

Commissioner of Patents and Trademarks